(12) United States Patent  
Desrosiers et al.

(10) Patent No.: US 12,346,703 B1  
(45) Date of Patent: Jul. 1, 2025

(54) OPTIMIZING CONTAINER STARTUP PERFORMANCE USING BLOCK LAYER STORAGE

(71) Applicant: Anyscale, Inc., San Francisco, CA (US)

(72) Inventors: Thomas Desrosiers, Berkeley, CA (US); Philipp Moritz, San Francisco, CA (US); Hsuan-Chi Kuo, San Lorenzo, CA (US); Lanbo Chen, Burlingame, CA (US)

(73) Assignee: Anyscale, Inc., San Francisco, CA (US)

( * ) Notice: Subject to any disclaimer, the term of this patent is extended or adjusted under 35 U.S.C. 154(b) by 100 days.

(21) Appl. No.: 18/379,055

(22) Filed: Oct. 11, 2023

(51) Int. Cl.
 *G06F 9/44* (2018.01)
 *G06F 9/445* (2018.01)
 *G06F 16/11* (2019.01)

(52) U.S. Cl.
 CPC ........ *G06F 9/44505* (2013.01); *G06F 16/113* (2019.01); *G06F 16/116* (2019.01); *G06F 16/128* (2019.01)

(58) Field of Classification Search
 CPC ..................................... G06F 1/32; G06F 9/44
 See application file for complete search history.

(56) References Cited

U.S. PATENT DOCUMENTS 8,688,666 B1\* 4/2014 Briggs ................ G06F 16/2219
 707/790
2023/0025529 A1\* 1/2023 Fu ......................... G06F 9/4406

\* cited by examiner

*Primary Examiner* — Keshab R Pandey  
(74) *Attorney, Agent, or Firm* — Van Pelt, Yi & James LLP

(57) ABSTRACT

A method, device, and system for starting containers is provided. The method includes (i) in response to determining to start a container, determining whether a container layer for the container has been previously converted to a block storage format; (ii) in response to determining that the container layer has not been previously converted to a block storage format, downloading an archived version of the container layer, converting the archived version into a block storage format version of the container layer, storing the block storage format version of the container layer into a blob storage, and starting the container; and (iii) in response to determining that the container layer has been previously converted to a block storage format, starting the container based at least in part on the block storage format version.

20 Claims, 7 Drawing Sheets

OPTIMIZING CONTAINER STARTUP PERFORMANCE USING BLOCK LAYER STORAGE

BACKGROUND OF THE INVENTION

Containerization is a method of packaging and deploying software applications and services, which isolates them from the underlying infrastructure and dependencies, thereby making the software applications and services portable and scalable across different environments. Containers are lightweight and efficient, thus enabling faster deployment and easier management compared to traditional virtual machines.

However, the process of creating and managing containers can be complex and time-consuming, requiring significant technical expertise. There is a need for a more efficient and user-friendly way of creating and managing containers.

BRIEF DESCRIPTION OF THE DRAWINGS

Various embodiments of the invention are disclosed in the following detailed description and the accompanying drawings.

DETAILED DESCRIPTION

Figure 1:
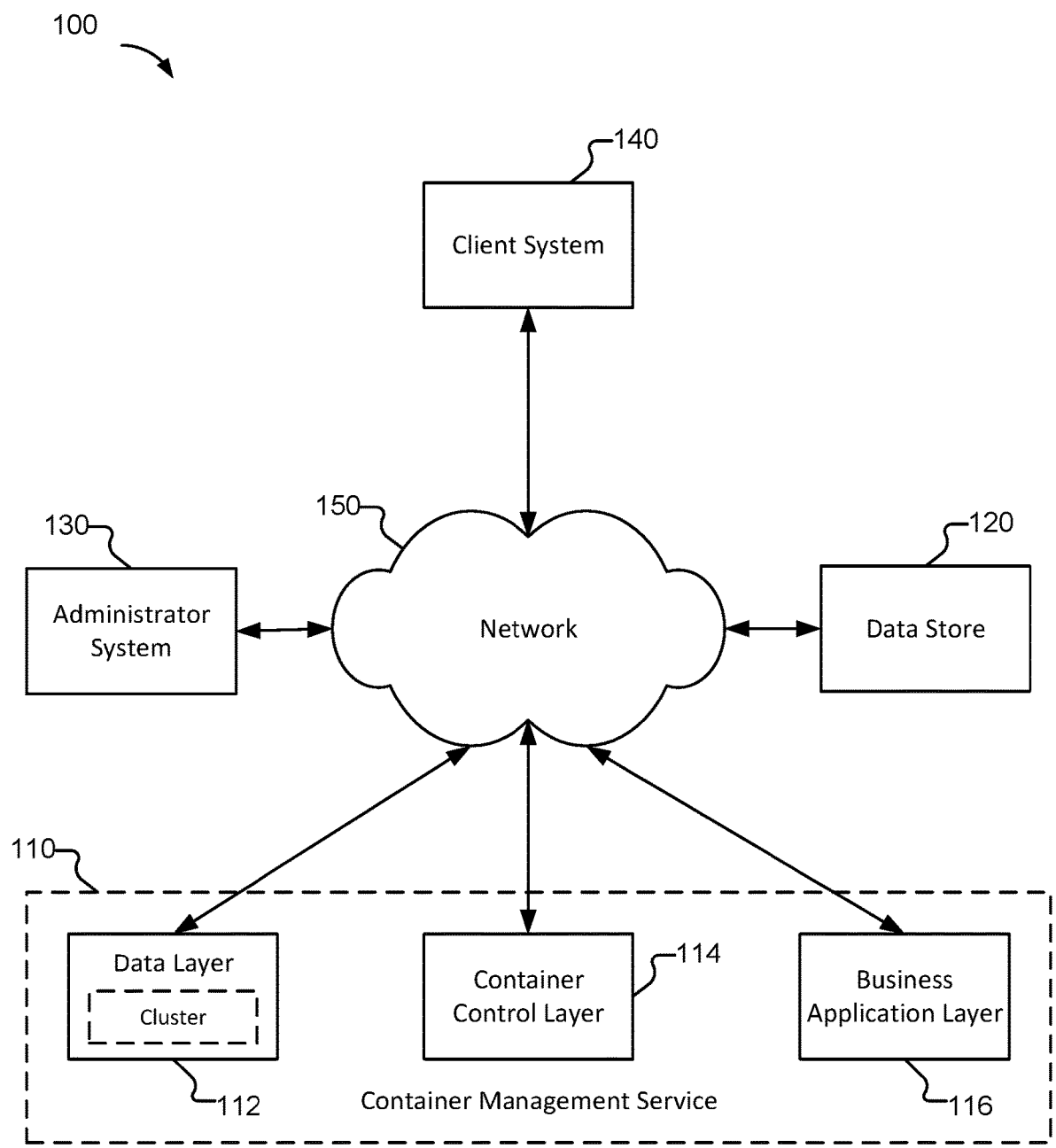
FIG. 1 is a block a diagram of a system for starting a container according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a container image may be a snapshot of a containerized application or service, which includes all the files, dependencies, and configurations required to run the application or service. The container image may be an entity that is created from one or more container layers and may be used as a template for creating new containers. A container image is generally stored in a container registry, and a system can pull the container image from the container registry and can deploy the container image on a system that supports containerization.

As used herein, a container layer may be a read-only filesystem layer that is used to build a container image. Each container layer associated with a container image comprises a set of files and directories, along with metadata that describes how the container layer should be assembled and combined with other layers to form a complete container image. In some embodiments, container layers are created using a union filesystem, which allows multiple container layers to be combined together in a single directory tree, without overwriting or conflicting with each other. In some embodiments, a metadata file is stored comprising a manifest of a set of files or layers in a container image.

In response to the system determining that a new container is to be created (e.g., started) from a container image, the container runtime executed by the system creates a read-write container layer on top of the read-only container layers of the container image, thereby allowing the container to store its own data and modifications separately from the base container image. The read-layer may correspond to a container layer, and it may be discarded when the container is stopped or removed.

Related art systems start containers by pulling a container image from a container registry, and then instantiating a container based on the container image. The process of starting a container involves several steps including downloading container layers, setting up network and storage resources, and configuring the container runtime. As an example, to start a container, related art systems generally use a container runtime to perform the following steps: (i) pulling the container image, (ii) downloading container layers, (iii) combining container layers, (iv) instantiating the container, and (v) starting the container. The system sends a request to the container registry to download the container image. The container registry responds with a list of container layers that are required to build the image, along with their unique identifiers. The system downloads the required container layers from the registry, using the unique identifier(s) to ensure that each container layer is correctly identified and retrieved. The container layers are downloaded from the registry to the local system (e.g., a local system running a virtual machine on which the container is started) and stored in local cache for future use. In response to downloading the container layers, the system uses the container runtime to create a new container based on the container image. Creating the container based on the container image includes setting up network and storage resources and configuring the container runtime according to the specifications in the container image. In response to instantiating the container, the system starts the container, which runs the application or service inside it. The container is isolated from the underlying system and has its own filesystem, network stack, and process namespace.

Container images and container layers can be stored in a variety of formats and compressions, depending on the container runtime and container registry used. The most common formats and compressions include:

Docker image format: the default image format used by the Docker container runtime, which stores container layers as compressed tar archives. The images are typically compressed using the gzip compression algorithm.

Open Container Initiative (OCI) image format: This is a standardized image format developed by the OCI, which is used by several container runtimes, including Docker, Kubernetes, and CRI-O. The format stores container layers as uncompressed tar archives, which can be compressed using various compression algorithms, such as gzip, bzip2, or Lempel-Ziv-Markov chain algorithm (LZMA).

Containerd image format: This is a lightweight image format developed by the Containerd project, which is used by several container runtimes, including Docker and Kubernetes. The format stores container layers as compressed tar archives, which can be compressed using various compression algorithms, such as gzip or zstd.

When downloading container images or layers, related art systems typically retrieve archived versions of the files from the container registry, and then decompress the archived versions before using them to start the container. The process of downloading and decompressing container images or layers involves the following steps: (a) downloading the archived files, which are compressed, (b) decompressing the files, (c) extracting the files, (d) combining files, and (e) starting the container. The system sends a request to the container registry to download the required container images or layers. The registry responds with an archived file, which may be compressed using gzip, bzip2, or another compression algorithm. After downloading the archived file, the system decompresses the downloaded file using the appropriate decompression algorithm. Once the file(s) has been decompressed, the system extracts the individual files and directories contained within it. For container layers, this involves extracting the filesystem tree for the container layer, along with any metadata and configuration files. In response to extracting the files, the system combines the extracted container layers into a single container image, using a union file system. The container layers are combined in the order specified by the configuration file for the container image. In response to combining the container layers, the system uses the container runtime to create and start the container, using the downloaded and extracted image or layers as the basis for the container's filesystem and configuration.

Various embodiments provide a system and method for instantiating containers, which simplifies the process of starting containers. Various embodiments allow systems to rapidly start up a container, such as in connection with configuring and providing a virtual workspace for a user. The user may use the workspace to use an application as a service, such as a service for code development. Accordingly, various embodiments enable a system to quickly deploy containers, reducing the time and effort required for containerization.

The system includes a container manager that provides a high-level abstraction layer for managing containers, allowing users to defined container properties such as container image, configuration, and networking. The system includes a container registry for storing container images and a container orchestrator for automating the deployment and scaling of containers.

Various embodiments provide a method, device, and system for starting up containers. The method includes (i) in response to determining to start a container, determining whether a container layer for the container has been previously converted to a block storage format; (ii) in response to determining that the container layer has not been previously converted to a block storage format: (a) downloading an archived version of the container layer, (b) converting the archived version into a block storage format version of the container layer, (c) storing the block storage format version of the container layer into a data storage, and (d) starting the container; and (iii) in response to determining that the container layer has been previously converted to a block storage format, starting the container based at least in part on the block storage format version.

In some embodiments, the use of block storage creates an improved computer system by enabling faster reading of container files and thereby faster starting of containers. In some embodiments, the block storage in combination with layers that allow strategic storing of layers that change more frequently and layers that change less frequently enable reconstruction of a container using caching techniques, where cached layers are readable even more rapidly than block stored layers.

FIG. 1 is a block a diagram of a system for starting a container according to various embodiments of the present application. In some embodiments, system 100 is implemented at least in part by system 200 of FIG. 2. In some embodiments, system 100 implements process 300 of FIG. 3, process 400 of FIG. 4, process 500 of FIG. 5, and/or process 600 of FIG. 6.

In the example illustrated in FIG. 1, system 100 includes container management service 110 and/or data store 120. System 100 may additionally include one or more of administrator system 130, client system 140, and network 150 over which one or more of container management service 110, data store 120, administrator system 130, and/or client system 140 are connected. In some embodiments, container management service 110 is implemented by a plurality of servers. In various embodiments, network 150 includes one or more of a wired network, and/or a wireless network such as a cellular network, a wireless local area network (WLAN), or any other appropriate network. System 100 may include various other systems or terminals.

In some embodiments, container management service 110 comprises data layer 112, container control layer 114, and/or business application layer 116. Data layer 112, container control layer 114, and/or business application layer 116 respectively implemented by one or more servers. In some embodiments, data layer 112 comprises one or more clusters of compute resources. Data layer 112 comprises a cluster of one or more virtual machines. Data layer may execute a container runtime in connection with configuring, instantiating, and/or starting a container.

In some embodiments, container management service 110 is invoked in connection with starting a container (e.g., on a virtual machine in the cluster of data layer 112) and providing the container to a user (e.g., via client system 140). For example, container management service 110 is invoked in connection with establishing an application as a service, such as an application that provides a workspace for an application development environment. Container management service 110 provides a user with access to the workspace as a service to a user via client system 140.

In some embodiments, in response to receiving a request for a container (or otherwise determining that a container is to be started), container management service 110 determines whether the container, or a portion thereof, has been previously converted to a block storage format. Container images/layers are typically stored in an archived format, such as one or more tar archive files. For example, each container layer comprises a set of files and directories that make up the contents of the corresponding part of the container image. Container management service 110 starts the container based at least in part on a determination of whether the container (or a portion thereof) has been previously converted to a block storage format. The downloading and decompressing of the applicable container images/layers add latency to the starting of the container. For example, related art systems that start containers based on the archived format container layers/images can take on the order of 15 seconds before the user is able to use the container, which is an inconvenient latency for users and inhibit providing a seamless experience for cloud-based services. The transition of starting containers from an archived format (e.g., the file-based compressed archives) to using block storage format files, if any, in connection with starting the container provides significant improvement in latency, at least with respect to subsequent starts of the container. According to various embodiments, on an initial download and decompressing of a container image/layer, container management service 110 additionally converts the container image/layer to a block storage format and stores the converted version of the container image/layer (e.g., a block storage-based format) for retrieval/use on subsequent starts/uses of the container. Although container management service 110 incurs the initial cost of performing a conversion on the container image/layer to generate the block storage format, container management service 110 realizes efficiency gains on subsequent starts of the container that can use the block storage format version of the container image/layer, or portion thereof.

In some embodiments, converting the archived format to a block storage format includes converting to a format that allows a system to fetch individual pieces from the file. For example, system 100 may store an index or smart client that identifies a particular piece of the file to be retrieved. The block storage format may enable files to be stored without any additional layer of abstraction between the block storage format version of a file and the file-based system. For subsequent starts, container management service 110 provides access to the location at which the block storage format file is stored and container management service 110 (e.g., data layer 112) directly uses such file to start the container (or a portion of such file and fetches and decompresses the other portions, such as updated layers).

Container management service 110 stores the block storage format version of files (e.g., containers, such as container images/layers) in a compressed format using a compression technology that is optimized for reading speed. For example, the block storage format version of the file is stored after being compressed using the Lempel-Ziv 4 (LZ4) compression algorithm. A compression technology that is optimized for reading speed may be a technology that compresses the file without causing a significant read penalty. As an illustrative example, such a compression technology may compress the file by 20% while only causing a 1% read speed penalty to be incurred. In some embodiments, the block storage format version comprises a set of blocks having a block size corresponding to a physical storage block size. In various embodiments, the block size is fixed, the block size is variable, the block size is one of a set of sizes, or any other appropriate block configuration.

In some embodiments, container management service 110 stores the block storage format version of files (e.g., containers, such as container images/layers) in a deduplicated format that enables efficient storage by reuse of previously stored blocks in any given stored container. For example, a container layer is converted to a block storage format including a plurality of blocks. Each of the plurality of blocks is checked to see whether any given block has been previously stored. In response to a given block being previously stored, storing a pointer to the previous block (e.g., using metadata) instead of the block in order to be able to reconstruct the container layer. Alternatively, storing a set of pointers to a set of blocks (e.g., using metadata) that comprise the container layer and using the set of pointers to reconstruct to In some embodiments, container management service 110 stores the block storage format version of files (e.g., containers, such as container images/layers) in a delta format that enables efficient storage by storing similar blocks of previously stored blocks in any given stored container. The storing of similar blocks using a difference from a similar block and indicating (e.g., using metadata) the similar block and the difference in order to be able to reconstruct the container layer.

When a container is to be started, container management service 110 determines the applicable container layers to be retrieved and used to start the container. As an example, container management service 110 may query a container registry for an indication of the applicable files. As containers change over time, the system stores new/updated versions of the container layer/image. Accordingly, a subsequent start of the container, the container layers for a container, or subset thereof, may correspond to updated versions of the container layer. The container registry may store an indication of the container layers, including the updated container layers, in a mapping of containers to container layers. In some embodiments, container management service 110 determines the applicable container layers to be retrieved and which, if any, of those container layers have been previously converted to a block storage format.

System 100 may use data store 120 or data layer 112 to store an index of container layers that are stored in block storage format. The index of container layers may include a mapping of a container layer identifiers, such as a hash or checksum for the container layer, to a location at which the container layer is stored. System 100 may further store an index of container layers associated with a particular container or version of the container. For example, system 100 may store a mapping of containers (or versions of containers) to identifiers for a set of corresponding container layers (e.g., the applicable container layers stored in the compressed format).

In some embodiments, container management service 110 is configured to be biased towards using a block storage format version of container layer over an archived version. Accordingly, container management service 110 determines the parts of the container to be used to start a container, the parts of the container (e.g., a set of container layers) that have not been previously converted to a block storage format, downloads such parts, and uses those parts in conjunction with any parts of the container that have been previously converted to block storage format. A container image may include a set of layers, including a base layer, and an environment-specific layer (e.g., a customer or user-defined configurations, such as the installation of customer software). In various embodiments, a layer comprises a collection of files at a given point of time. In some embodiments, a base layer comprises files that contain an operating system. In some embodiments, a layer includes environmental software files. In some embodiments, a layer comprises a single piece of software. In some embodiments, the base layer does not change, or infrequently changes, and thus a block storage format version of the base layer may be used for subsequent starts of the container. Conversely, the environment-specific layer may change relatively frequently. Upon being requested to start a container, container management service 110 determines whether a version of an environment-specific layer is to be used to start the container and determines whether that version of the environment-specific layer has been previously converted to a block storage format version. If the system stores a block storage format version of the environment-specific layer, container management service 110. Otherwise, container management service 110 uses the archived version (e.g., a compressed file) of the environment-specific layer to start the container and correspondingly converts the environment-specific layer to a block storage format version for subsequent container starts.

In some embodiments, container management service 110 determines a version of the container to be instantiated. In response to determining that the version the container is not an initial version of the container, determine a difference between the version of the container to be instantiated and a previously instantiated version of the container. As an example, determining that the version of the container is not an initial version may include determining that the current version of the container is different from the original or first version of the container. As another example, determining that the version of the container is not an initial version may include determining that the version of the container to be instantiated is different from the previously instantiated version. The system may determine that a version of the container to be instantiated based at least in part on a determination of a set of container layers to be used to instantiate the containers, and associated versioning for the set of container layers. The system may then determine a subset of container layers that has previously been converted to block storage and a subset of container layers that have not been converted to block storage that are to be fetched from data store 120 in the archived format (e.g., which is used to instantiate the container and to subsequently, or in parallel, convert to block storage format for future instantiations). The system fetches the difference between the version of the container to be instantiated and a previously instantiated version of the container. The container is instantiated based at least in part on the difference between the version of the container to be instantiated and a previously instantiated version of the container. After the difference between the version of the container to be instantiated and a previously instantiated version of the container is converted to block storage format, container management service 110 stores the block storage format in a data storage (e.g., a blob storage).

In some embodiments, in connection with an initial start of a container, container management service 110 downloads an entirety of the archive-based files (e.g., the compressed format versions of the container image/layers, such as a GZipped tar archive file) used in the instantiation of the requested layer. Container management service 110 incurs the cost of converting the entirety of the archive-based files to a block storage format for subsequent use in starting the container or another version of the container. Some related art systems only download a subset of the archive-based files used to start the container, configure a user interface/operating system to enable a user to use the container in a manner such that certain aspects of the container appear to be available but are not yet downloaded. The related art systems download the remaining parts of the archive-based files in the background. Thus, the downloading of the entirety of the archive-based files for an initial start of the container is non-intuitive. The upfront overhead of downloading the entirety of the archive-based files and converting such files to block storage format enables quick subsequent starts of the container, thereby providing users with a seamless interaction with which to use an application (e.g., a workspace for code development).

In some embodiments, container management service 110 converts a container image/layer asynchronously with the starting of the container. For example, if container management service 110 determines that a container image/layer has not been previously converted, container management service 110 starts the container based on using the archived format version (e.g., downloads the archived version, decompresses the archived version, and starts the container based on such decompressed version), and container management service 110 separately converts the downloaded archived format version to a block storage format version. Container management service 110 may convert the container image/layer to the block storage format version asynchronously with the starting of the container (e.g., after the container has been started using the archived format version). Alternatively, container management service 110 may convert the container image/layer to the block storage format version in parallel (e.g., using a different compute resource) with the starting of the container using the archived format version.

In some embodiments, container control layer 114 receives request(s) for starting containers (e.g., via business application layer 116) and causing data layer 112 to process the corresponding workload. Container control layer 114 may query the container registry for an indication of the container images/layers that are to be used to start the container. Container control layer 114 may monitor the use of the container and cause data layer 112 to store the container (e.g., an updated version of the container) and to terminate the container upon termination of the session (e.g., by a user of client system 140).

In some embodiments, data layer 112 manages a cluster of compute resources to start containers and provide the containers (e.g., the compute environments to client systems, such as client system 140). For example, data layer 112 establishes the connections between the set of compute resources and the data source(s) and allocates the workload for the instantiation of containers across the set of compute resources. Data layer 112 further allocates the workload for converting the archived format version of a file to a block storage format version.

According to various embodiments, business application layer 116 provides an interface via which a user (e.g., using client system 140) may interact with various applications such as a development application for developing a service, application, and/or code, an application to access raw data (e.g., data stored in data store 120), an application to analyze data (e.g., log data), etc. Various other applications can be provided by business application layer 116. For example, a user queries data layer 112 by sending a query/request to business application layer 116, which interfaces with container control layer 114 to control data layer 112 and/or data store 120 to obtain information responsive to the query (e.g., business application layer 116 formats the query according to the applicable syntax and sends the formatted query to data layer 112, such as via container control layer 114). As another example, an administrator uses an interface provided/configured by business application layer 116 to configure (e.g., define) one or more security policies including access permissions to information stored on data store 120 permission to access performance profiles, etc.

System 100 comprises administrator system 130 for use by an administrator. For example, administrator system 130 comprises a system for communication, data access, computation, etc. An administrator uses administrator system 130 to maintain and/or configure container management service 110 and/or one or more data stores (e.g., data store 120). For example, an administrator uses administrator system 130 to (i) start and/or stop services on container management service 110 and/or data store 120, (ii) reboot data store 120, (iii) install software on container management service 110 and/or data store 120, and/or (iv) add, modify, and/or remove data on data store 120, etc. Administrator system 130 communicates with container management service 110 and/or data store 120 via a web-interface. For example, administrator system 130 communicates with container management service 110 and/or data store 120 via a web-browser installed on administrator system 130. As an example, administrator system 130 communicates with container management service 110 and/or data store 120 via an application running on administrator system 130.

In various embodiments, an administrator (or other user associated with a tenant or entity with which the tenant is associated such as a customer) uses administrator system 130 to configure a service provided to a tenant. As an example, the administrator uses administrator system 130 to communicate with container management service 110 to configure the service provided to the tenant. For example, administrator system 130 may communicate with container management service 110 via business application layer 116. In some embodiments, business application layer 116 serves as a gateway via which the administrator may interface to manage, configure, etc. data layer 112, container control layer 114, and/or business application layer 116. Administrator system 130 may configure one or more policies for container management service 110, such as one or more security policies and/or one or more compute resource policies (e.g., a resource allocation policy), etc.

Data store 120 stores one or more datasets. In various embodiments, the one or more datasets comprise container data, code development data, human resources data, financial data, organizational planning data, or any other appropriate data. The container data may include files for one or more containers (e.g., containers that are started up to provide the container as a service via container management service 110). For example, the files for the one or more containers comprise container images or container layers. The container data may further include an index or mapping of containers to corresponding files (e.g., a mapping of container identifiers to corresponding files to be used to start the container). For example, the container data comprises a container registry that is queried by container management service 110 to identify the container layers to be retrieved/used in connection with starting the container. The container identifier may comprise a unique identifier for the container and/or a version identifier for the container.

In some embodiments, data store 120 stores one or more datasets for a plurality of tenants. For example, data store 120 hosts at least part of a software as a service (e.g., a database storing data for the service) for a plurality of tenants such as customers for a provider of the software as a service). Data store 120 may store container data for each of the tenants for which container management service 110 provides access to customers' users. In various embodiments, a tenant comprises an organization such as a company, a government entity, a sub-organization of an organization (e.g., a department), or any other appropriate organization.

According to various embodiments, a user uses system 100 (e.g., a client or terminal, such as client system 140, that connects to container management service 110 via network 150) to define business logic and/or to execute such business logic with respect to data (e.g., one or more datasets) stored on data store 120. For example, a user inputs to client system 140 a request for an application environment, such as a code development environment. In response to receiving the request for the application environment, client system 140 sends the request to container management service 110. The request may include an identifier for the container associated with the environment being requested. Alternatively, or additionally, the request includes a user identifier that container management service 110 uses to determine the environment associated with the user, such as a last environment being used by the user.

In some embodiments, data layer 112, container control layer 114, and/or business application layer 116 are implemented on a single server or a plurality of servers. For example, data layer 112 and business application layer 116 are different modules running on the same server or set of servers.

Figure 2:
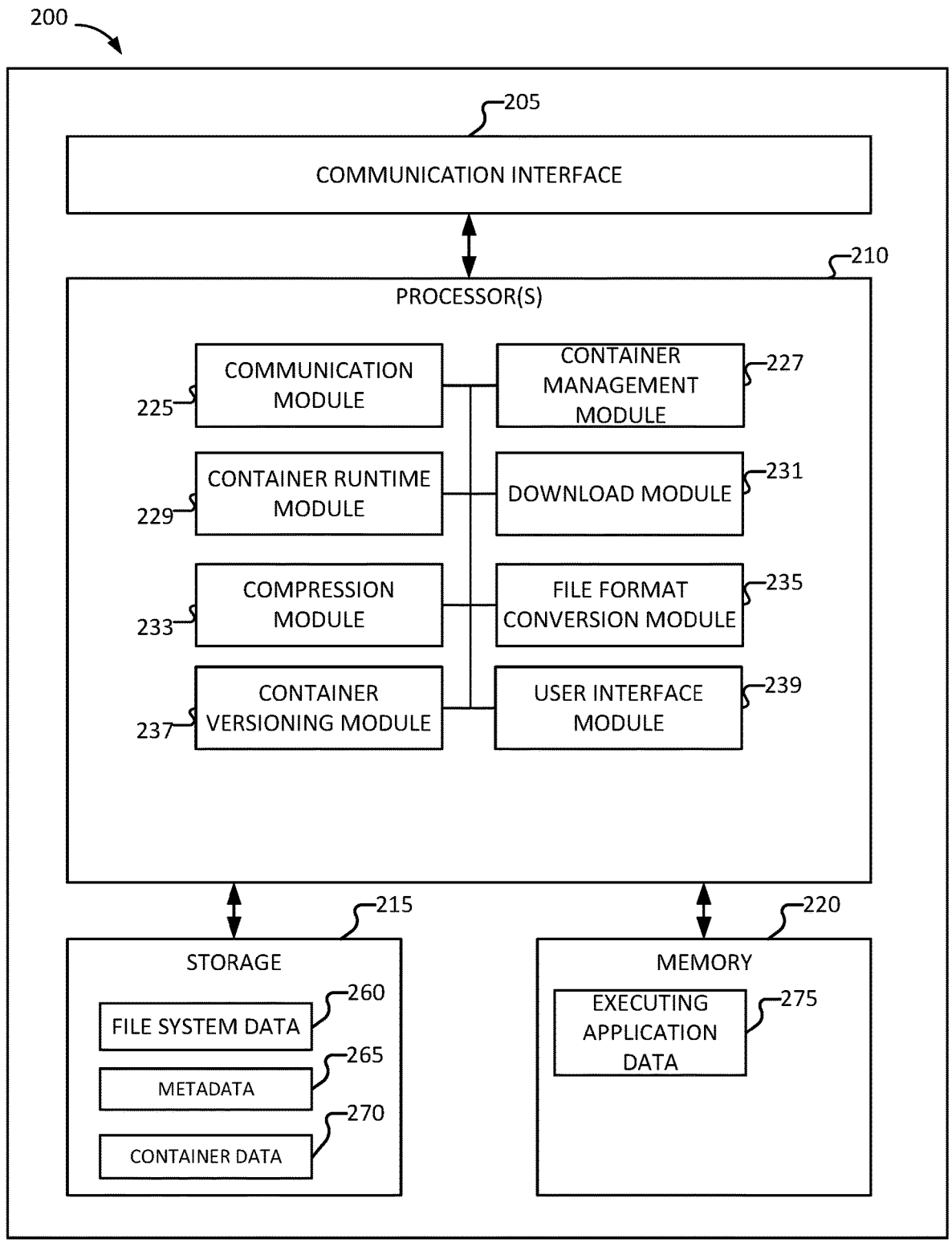
FIG. 2 is a block diagram of a system for starting a container according to various embodiments of the present application.

FIG. 2 is a block diagram of a system for starting a container according to various embodiments of the present application. In some embodiments, system 200 implements at least part of system 100 of FIG. 1. In some embodiments, system 200 implements process 300 of FIG. 3, process 400 of FIG. 4, process 500 of FIG. 5, process 600 of FIG. 6, and/or process 700 of FIG. 7.

In the example shown, system 200 implements one or more modules in connection with starting containers and/or providing the container to a user, such as to provide a corresponding application as a service. System 200 comprises communication interface 205, one or more processors 210, storage 215, and/or memory 220. One or more processors 210 comprises one or more of communication module 225, container management module 227, container runtime module 229, download module 231, compression module 233, file format conversion module 235, container versioning module 237, and/or user interface module 239.

In some embodiments, system 200 comprises communication module 225. System 200 uses communication module 225 to communicate with various client terminals or user systems such as a user system (e.g., client system 140) or an administrator system (e.g., administrator system 130), various other services, or data store 120, etc. For example, communication module 225 provides to communication interface 205 information that is to be communicated to the other systems or services. As another example, communication interface 205 provides to communication module 225 information received by system 200. Communication module 225 is configured to receive one or more queries or requests to execute business logic (e.g., requests for processing workloads, servicing queries, etc.) such as from various client systems (e.g., via a business application layer), and/or requests for an application environment or to start a container, etc. The one or more queries or requests to execute tasks is with respect to information stored in one or more datasets (e.g., data stored in data store 120), such as containers stored in the dataset (e.g., the container images/layers used to start the container). Communication module 225 is configured to provide various client terminals or user systems information such as information that is responsive to the one or more queries or tasks requested to be executed. For example, communication module 225 is configured to provide access to a container, such as a user interface for an application environment running on the container.

In some embodiments, system 200 comprises container management module 227. System 200 uses container management module 227 to manage containers, including storing images for container, updating a container registry to include a mapping of containers to corresponding container files (e.g., container images/layers), maintaining versioning information for containers, etc.

In some embodiments, system 200 comprises container runtime module 229. System 200 uses container runtime module 229 to manage the lifecycle of a container. For example, container runtime module 229 is responsible for starting, stopping, and interacting with containers. When a user runs the container, container runtime module 229 creates the container from a container image (e.g., a set of container layers), sets up the environment inside the container, and starts the processes that are specified in the container configurations.

Container runtime module 229 may also provide isolation and security for containers by creating namespaces and control groups. Namespaces allow containers to have their own isolated view of system resources, such as the network, file system, and process space. Control groups allow the container runtime to limit the number of resources that a container can use, such as processors (e.g., a central processing unit (CPU)), memory, and disk space.

In some embodiments, system 200 comprises download module 231. System 200 uses download module 231 to fetch the applicable container information (e.g., the container images/layers) that are needed to start the container. Container management module 227 may query a container registry or other index that stores a mapping of containers to container images/layers to determine the files to be fetched in connection with starting the container. For example, container management module 227 determines whether any container images/layers have been previously converted to a block storage format and/or whether any files in the compressed format are to be fetched (e.g., if a new version of a container layer, which has not yet been converted to block storage, is to be used to start the container). In response to determining the files to be fetched, system 200 uses download module 231 to fetch the files. Download module 231 may download the files using a bit torrent protocol.

In some embodiments, system 200 comprises compression module 233. System 200 uses compression module 233 to compress or decompress files. For example, compression module 233 decompresses the container images/layers used in connection with starting the container. Compression module 233 may decompress files stored in the archived format and/or files stored in the block storage format (e.g., block storage format files that are compressed using a compression algorithm optimized for read speed). In response to decompressing the files, container runtime module 229 uses the decompressed files to start the container.

In some embodiments, system 200 comprises file format conversion module 235. System 200 uses file format conversion module 235 to convert container files (e.g., the container images/layers that have not been previously converted to block storage format) from an archived version (e.g., an compressed file) to a block storage format version. System 200 stores the converted files (e.g., the resulting block storage format versions) to a block storage (e.g., for use in connection with subsequent starts of the container). Container management module 227 may update a mapping of containers to block storage format versions of the container images/layers.

In some embodiments, system 200 comprises container versioning module 237. System 200 uses container versioning module 237 to maintain versioning of the containers, such as by versioning container images/layers. The versioning of the containers may be used in connection with determining whether a version of a container image or container layer has been previously converted to block storage format or determining the set of container layers to be used to instantiate a container.

In some embodiments, system 200 comprises user interface module 239. System 200 uses user interface module 239 in connection with configuring information (or the display thereof) to be provided to the user such as via administrator system 130 and/or client system 140 of system 100. For example, user interface module 239 configures and provides a user interface via which a user accesses an environment running on a container. In some embodiments, user interface module 239 configures a user interface to be displayed at a client system, such as an interface that is provided in a web browser at the client system. User interface module 239 may configure a user interface via which a user may develop code.

According to various embodiments, storage 215 comprises one or more of file system data 260, metadata 265, and/or container data 270. Storage 215 may comprise a shared storage system (e.g., a network storage system). In some embodiments, file system data 260 comprises a database such as one or more datasets (e.g., one or more datasets for one or more tenants, etc.). In some embodiments, container data 270 stores container layer data in a block storage format. In some embodiments, container data 270 comprises a blob storage.

In some embodiments, metadata 265 comprises information pertaining to containers. For example, metadata 265 stores an indication of container images/layers associated with particular containers (e.g., a mapping of containers to files). Metadata 265 may store an index of containers (or particular files for the containers) that have been previously converted to block storage format. Additionally, metadata 265 may store a mapping of containers to block storage format versions of the container images/layers. For example, metadata 265 stores an indication of files that have been converted from an archived version to a block storage format version.

According to various embodiments, memory 220 comprises executing application data 275. Executing application data 275 comprises data obtained or used in connection with executing an application such as an application executing on container associated with a tenant. In some embodiments, the application comprises one or more applications that perform one or more of receive and/or execute a query or task, generate a report and/or configure information that is responsive to an executed query or task, and/or provide to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, etc.).

Figure 3:
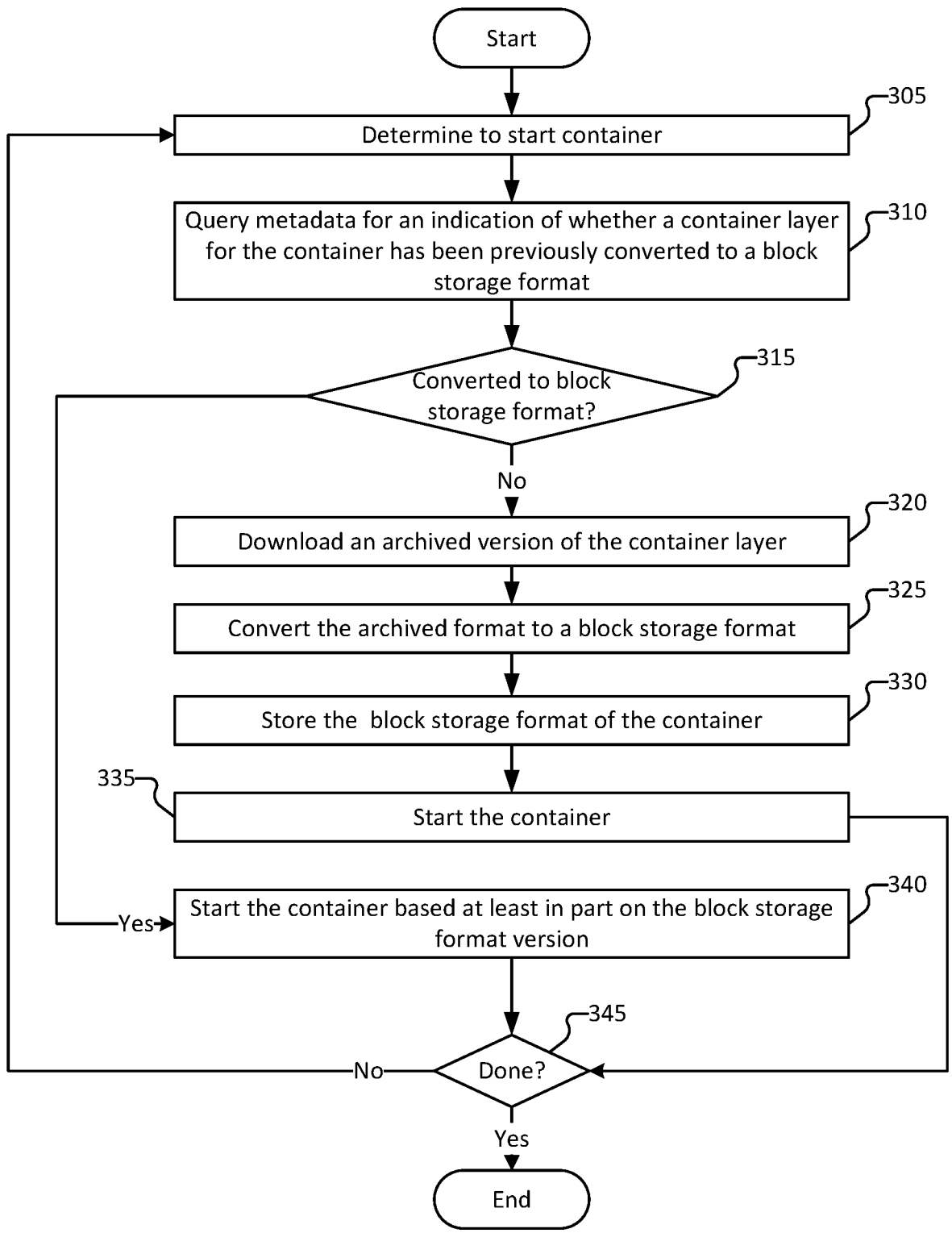
FIG. 3 is a flow diagram of a method for starting a container according to various embodiments of the present application.

FIG. 3 is a flow diagram of a method for starting a container according to various embodiments of the present application. In some embodiments, process 300 is implemented by system 100 of FIG. 1 and/or system 200 of FIG. 2.

At 305, the system determines to start a container. In some embodiments, the system receives a request to start a container based on a user request, such as an indication that a user requests to access an application (e.g., an environment that is to run on a container). The system may determine an identifier associated with the container to be started.

At 310, the system queries metadata for an indication of whether a container layer for the container has been previously converted to a block storage format. For example, the system queries a container registry or other index of files stored in a block storage format.

At 315, the system determines whether the container layer for the container has been converted to a block storage format. In response to receiving the result from querying the metadata, the system determines whether the container layer for the container has been previously converted to a block storage format.

In response to determining that the container layer for the container has been converted to a block storage format at 315, process proceeds to 340. At 340, the container is started based at least in part on the block storage format version. As an example, the system provides the container runtime with access to the container (or applicable container layer(s)) stored at the block storage system, and the container runtime directly accesses the block storage format version of the container layer.

Conversely, in response to determining that the container layer for the container has not been converted to a block storage format at 315, process 300 proceeds to 320.

At 320, an archived version of the container layer is downloaded.

At 325, the archived version of the container layer is converted to a block storage format. The system may convert the archived version of the container layer based on a predefined algorithm. In some embodiments, the system uses archived version of the container layer, which was fetched to start the container, to convert to the block storage format. For example, with each applicable container layer, the system performs a single fetch of the archived version, which is used both for starting a container and converting to a block storage format version to be used in subsequent starts of the container. In some embodiments, the archived version of the container layer comprises a set of files that have been compressed.

At 330, the block storage format of the container is stored. In some embodiments, the system stores the block storage format of the container (e.g., the applicable container layer that is converted) to block storage.

In some embodiments, the system iterates over 315-330 for each container layer to be used to start the container. For example, in some instances a container may have been updated and thus have multiple versions of a certain container layer(s), such as the environment-specific layer. For each container layer, the system determines whether container layer has been previously converted to block storage format, and such layer has not been previously converted, the system fetches the compressed format version of the container layer and the archived version in connection with starting the layer.

At 335, the container is started. In response to starting the container at 335, process 300 proceeds to 345.

In some embodiments, the system converts the container layer to a block storage format after the container has been started using the applicable archived versions. For example, if a container layer used in starting the container has not been previously converted, the system uses the archived version of the container layer in connection with starting the container layer and thereafter, or in parallel, converts the archived version of the container layer to a corresponding block storage format version.

At 345, a determination is made as to whether process 300 is complete. In some embodiments, process 300 is determined to be complete in response to a determination that the container has been successfully started, no further containers are to be started, the user has exited the system (e.g., the user exits a workspace that is provided by the instantiated container), an administrator indicates that process 300 is to be paused or stopped, etc. In response to a determination that process 300 is complete, process 300 ends. In response to a determination that process 300 is not complete, process 300 returns to 305.

Figure 4:
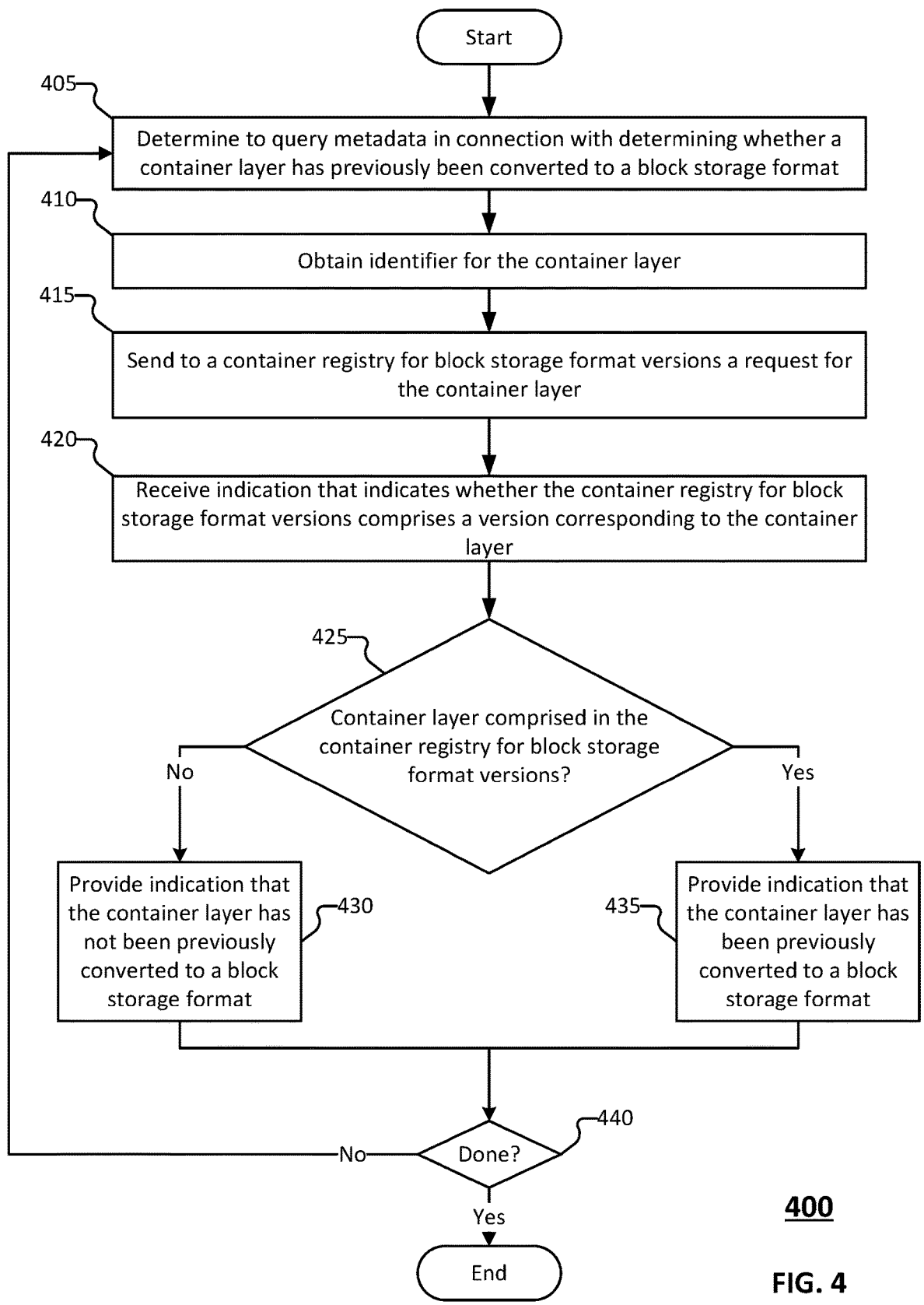
FIG. 4 is a flow diagram of a method for determining whether a container layer has previously been converted to a block storage format according to various embodiments of the present application.

FIG. 4 is a flow diagram of a method for determining whether a container layer has previously been converted to a block storage format according to various embodiments of the present application. In some embodiments, process 400 is implemented by system 100 of FIG. 1 and/or system 200 of FIG. 2. Process 400 may be invoked by 310 of process 300. The system may invoke process 400 for each container layer to be used to start a requested container.

At 405, the system determines to query metadata in connection with determining whether a container layer has previously been converted to a block storage format. In some embodiments, the system determines to query the metadata in response to the system receiving a request to start a container. In some embodiments, the metadata is stored in a data storage. In some embodiments, the metadata is stored in a block storage format. In some embodiments, the metadata is stored in a data storage that stores containers in a block storage format.

At 410, an identifier for the container layer is obtained. The container layer identifier may be retrieved from the request/indication to determine whether the container layer has been previously converted, or from a container registry that indexes the container layers associated with a particular container (e.g., the container to be started) based on the container determined to be associated with a request to start the container (e.g., a container identifier comprised in the request to start the container, a user identifier for the user/system requesting access to the environment running on the container, etc.).

At 415, the system sends a request for the container layer to a container registry for block storage format versions. The system may store a container registry or other index that indicates the container layers (or container layer versions) that have been previously converted to block storage format versions.

At 420, the system receives an indication that indicates whether the container registry for block storage format versions comprises a version corresponding to the container layer. For example, the system deems the indication of whether the container registry stores a version corresponding to the container layer as a proxy for determining whether the container layer has been previously converted from an archived format to a block storage format.

At 425, the system determines whether the container registry comprises a block storage format version of the container layer. In response to determining that the container registry does not comprise a block storage format version of the container layer at 425, process 400 proceeds to 435. In response to determining that the container registry comprises a block storage format version of the container layer at 425, process 400 proceeds to 435.

At 430, the system provides an indication that the container layer has not been previously converted to a block storage format. In some embodiments, the system provides the indication that to another system or service that invoked process 400, such as a container runtime that is executing the start of the corresponding container.

At 430, the system provides an indication that the container layer has been previously converted to a block storage format. In some embodiments, the system provides the indication that to another system or service that invoked process 400, such as a container runtime that is executing the start of the corresponding container.

At 440, a determination is made as to whether process 400 is complete. In some embodiments, process 400 is determined to be complete in response to a determination that the container has been successfully started, no further container layers are to be retrieved in connection with starting a container, no further containers are to be started, the user has exited the system (e.g., the user exits a workspace that is provided by the instantiated container), an administrator indicates that process 400 is to be paused or stopped, etc. In response to a determination that process 400 is complete, process 400 ends. In response to a determination that process 400 is not complete, process 400 returns to 405.

Figure 5:
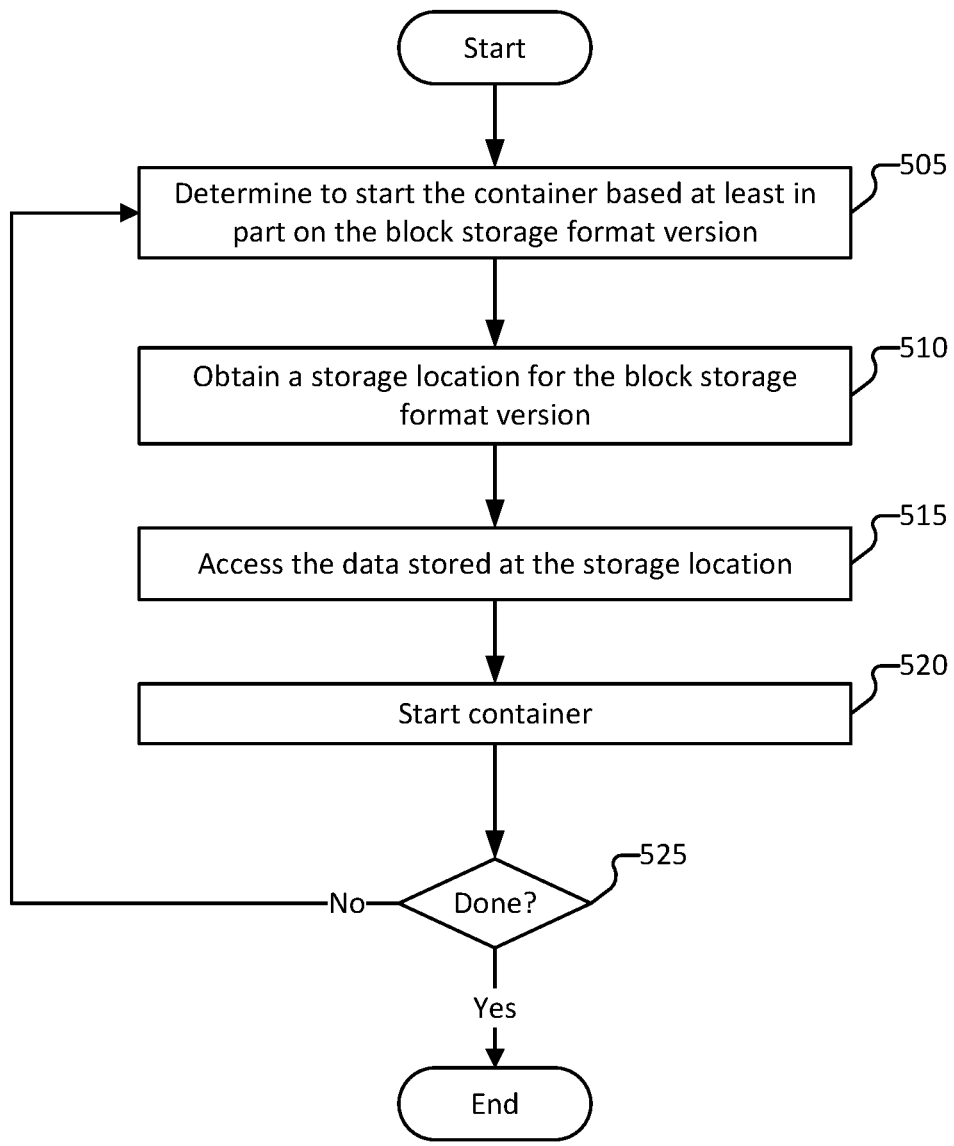
FIG. 5 is a flow diagram of a method for starting a container using previously converted block storage format version according to various embodiments of the present application.

FIG. 5 is a flow diagram of a method for starting a container using previously converted block storage format version according to various embodiments of the present application. In some embodiments, process 500 is implemented by system 100 of FIG. 1 and/or system 200 of FIG. 2. Process 500 may be invoked by 340 of process 300.

At 505, the system determines that the container is to be started based at least in part on the block storage format version. For example, the system determines that the block storage format version is to be used to start the container in response to determining that the container layer had been previously converted to the block storage format.

At 510, the system obtains the storage location for the block storage format version. In some embodiments, the system queries a container registry or index that stores a storage location in association with a container or container layer. The system may store different indexes for compressed format versions and block storage format versions of the container layers.

At 515, the system obtains the data stored at the storage location. For example, the system (e.g., a container runtime) is provided with access to the storage location on the block storage system at which the block storage format version is stored. The container runtime may directly access the block storage system to retrieve the corresponding block storage format version of the container layer(s).

At 520, the system starts the container. For example, the system (e.g., the container runtime) starts the container based on using (i) the available block storage format version of the container layer(s) associated with the container, and (ii) any additional compressed format versions of container layer(s) associated with the container that have not been previously converted to block storage format.

At 525, a determination is made as to whether process 500 is complete. In some embodiments, process 500 is determined to be complete in response to a determination that the container has been successfully started, no further block storage format versions of container layers are to be retrieved in connection with starting a container, no further containers are to be started, the user has exited the system (e.g., the user exits a workspace that is provided by the instantiated container), an administrator indicates that process 500 is to be paused or stopped, etc. In response to a determination that process 500 is complete, process 500 ends. In response to a determination that process 500 is not complete, process 500 returns to 505.

Figure 6:
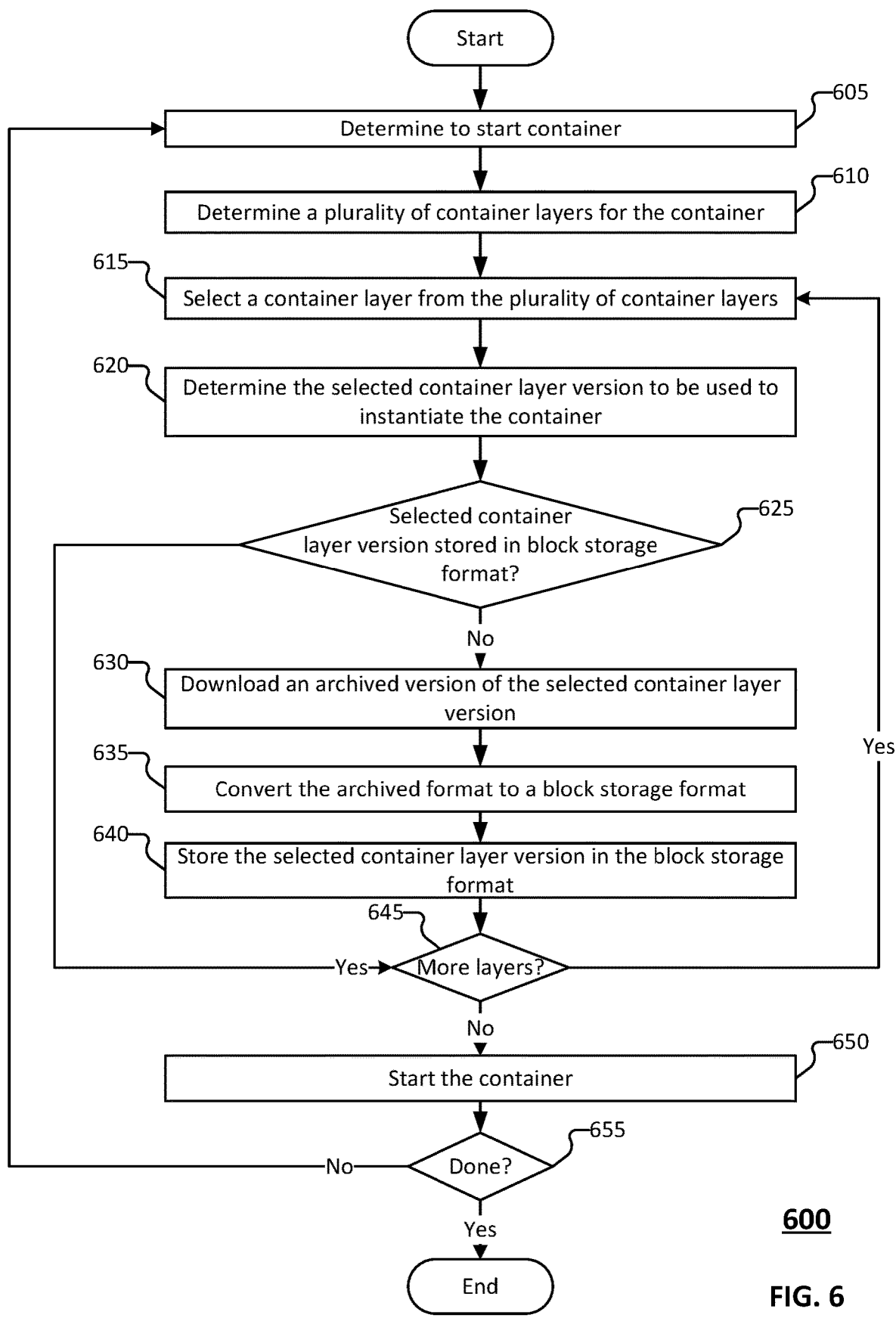
FIG. 6 is a flow diagram of a method for starting a container according to various embodiments of the present application.

FIG. 6 is a flow diagram of a method for starting a container according to various embodiments of the present application. In some embodiments, process 600 is implemented by system 100 of FIG. 1 and/or system 200 of FIG. 2.

At 605, the system determines to start a container. In some embodiments, the system determines to start the container in response to receiving a request for an environment that is to be run on a container.

At 610, the system determines a plurality of container layers for the container. In some embodiments, the system queries a container registry for an indication of the container layers corresponding to the container to be started.

At 615, the system selects a container layer from the plurality of container layers.

At 620, the system determines the selected container layer version to be used to instantiate the container. Alternatively, 610 and 620 may be combined. For example, the container registry may indicate the applicable versions of the container layers corresponding to the container to be started.

At 625, the system determines whether the selected container layer version is stored in a block storage format. In response to determining that the applicable version of the selected container layer is stored in a block storage format at 625, process 600 proceeds to 645, and process 600 iterates over 615 to 645 until no further container layers are to be used to start the container. Conversely, in response to determining that the applicable version of the selected container is not stored in a block storage format at 625, process 600 proceeds to 630.

At 630, the system downloads an archived version of the selected container layer version.

At 635, the system converts the compressed format of the selected container layer version to a block storage format. The block storage format of the container layer may be stored in a blob storage after conversion to the block storage format version.

At 640, the system stores the version of the selected container layer in the block storage format.

At 645, the system determines whether another layer(s) is to be evaluated and/or converted in connection with starting the container. In some embodiments, process 600 iterates over 615-645 until all of the plurality of container layers for the container have been evaluated and/or converted. In response to determining that another layer(s) is to be evaluated and/or converted in connection with starting the container at 645, process 600 returns to 615. Conversely, in response to determining that no further layers are to be evaluated and/or converted in connection with starting the container at 645, process 600 proceeds to 650.

At 650, the system starts the container. In some embodiments, the system starts the container before (or in parallel with) the container layer(s) being converted to block storage format versions. For example, for container layers that have not been previously converted to block storage format, the system decompresses the archived version and uses the corresponding file in connection with starting the container, and thereafter converts the downloaded archived version to a block storage format version to be used for subsequent starts of the container.

The system may start the container based on a blend of block storage format of container layers and archived versions of container layers for the container layers required to start the container. For example, the system is biased to use block storage format versions of container layers that are available (e.g., that been previously converted, such as in connection with a previous start of the container), and for any container layer that has not been previously converted to block storage format, the system uses archived versions of the container layer.

At 655, a determination is made as to whether process 600 is complete. In some embodiments, process 600 is determined to be complete in response to a determination that the container has been successfully started, no further containers are to be started, the user has exited the system (e.g., the user exits a workspace that is provided by the instantiated container), an administrator indicates that process 600 is to be paused or stopped, etc. In response to a determination that process 600 is complete, process 600 ends. In response to a determination that process 600 is not complete, process 600 returns to 605.

Figure 7:
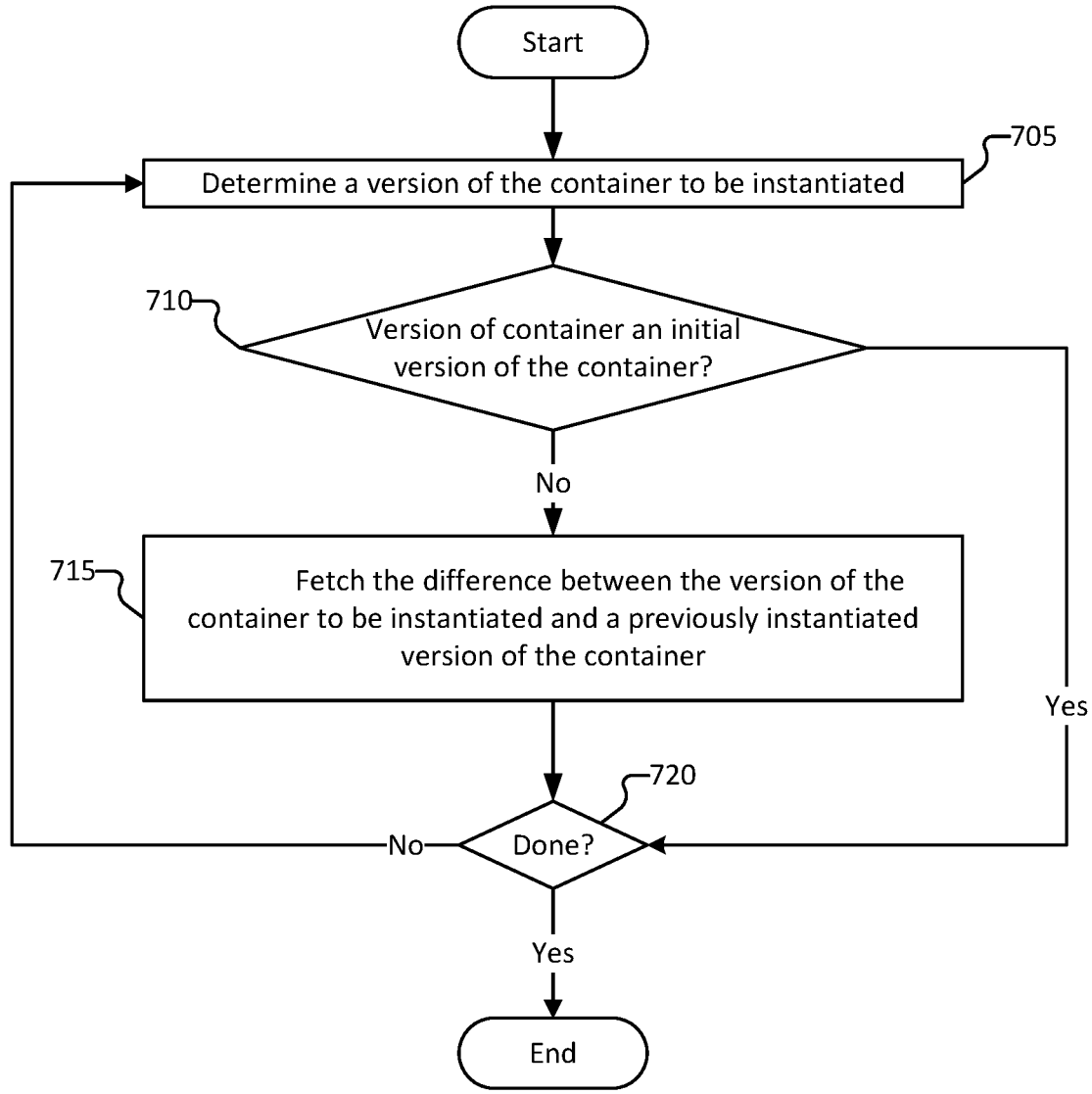
FIG. 7 is a flow diagram of a method for starting a container according to various embodiments of the present application.

FIG. 7 is a flow diagram of a method for starting a container according to various embodiments of the present application. In some embodiments, process 700 is implemented by system 100 of FIG. 1 and/or system 200 of FIG. 2. Process 700 may be invoked in connection with 310-320 of process 300. The system may invoke process 700 for each container layer to be used to start a requested container.

At 705, the system determines a version of the container to be instantiated.

At 710, the system determines whether the version of the container is an initial version of the container. Alternatively, the system may determine whether the version of the container is was previously converted to block storage format. For example, the system determines whether the version container was previously retrieved and instantiated (e.g., whether the version of the container, or a portion thereof, was previously converted to block storage format).

In response to determining that the version of the container is not an initial version of the container at 710, process 700 proceeds to 715 at which the system fetches the difference between the version of the container to be instantiated and a previously instantiated version of the container.

In some embodiments, the difference between the version of the container to be instantiated and a previously instantiated version of the container corresponds to a subset of the layers associated with the container to be instantiated, such as the layers that have not yet been converted to block storage format.

In some embodiments, after the difference between the version of the container to be instantiated and a previously instantiated version of the container is converted to block storage format, the block storage format is stored in a blob storage.

At 720, a determination is made as to whether process 700 is complete. In some embodiments, process 700 is determined to be complete in response to a determination that the container has been successfully started, no further containers are to be started, the user has exited the system (e.g., the user exits a workspace that is provided by the instantiated container), an administrator indicates that process 700 is to be paused or stopped, etc. In response to a determination that process 700 is complete, process 700 ends. In response to a determination that process 700 is not complete, process 700 returns to 705.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a memory;
   one or more processors configured to:
   in response to determining to start a container, determine whether a container layer for the container has been previously converted to a block storage format;
   in response to determining that the container layer has not been previously converted to a block storage format,
   download an archived version of the container layer;
   convert the archived version into a block storage format version of the container layer;
   store the block storage format version of the container layer into a data store; and
   start the container; and
   in response to determining that the container layer has been previously converted to a block storage format, start the container based at least in part on the block storage format version.

2. The system of claim 1, wherein subsequent starts of the container uses the block storage format version of the container and does not require a corresponding download of the archived version of the container.

3. The system of claim 1, wherein subsequent starts of the container layer does not require a conversion of the container layer from a archived version of the container to a block storage format of the container.

4. The system of claim 1, wherein the archived version of the container comprises a compressed file-based archive.

5. The system of claim 1, wherein a first instantiation of the container includes downloading an entire archived version of the container before starting up the container.

6. The system of claim 1, wherein:
   the one or more processors are further configured to:
   determine a version of the container to be instantiated;
   in response to determining that the version the container is not an initial version of the container, determine a difference between the version of the container to be instantiated and a previously instantiated version of the container; and fetch the difference between the version of the difference between the version of the container to be instantiated and a previously instantiated version of the container; and the container is instantiated based at least in part on the difference between the version of the container to be instantiated and a previously instantiated version of the container.

7. The system of claim 6, wherein:
the difference is stored in a archived; and
fetching the difference comprises:
in response to determining that the difference has not been previously converted to a block storage format version, converting the difference to a block storage format version.

8. The system of claim 7, wherein the difference is stored in the blob storage after conversion of the difference to a block storage format version.

9. The system of claim 1, wherein the container comprises an entire file system for a machine to be instantiated.

10. The system of claim 1, wherein the container comprises a plurality of container layers.

11. The system of claim 10, wherein determining whether the container layer for the container has been previously converted to the block storage format comprises:
for each of the plurality of container layers for the container,
determine a version of container layer to be used, and determine if it has been converted; and
determine whether the version of the container layer has been previously converted to a block storage format.

12. The system of claim 10, wherein the version of the container layer comprises a hash or checksum for the container layer.

13. The system of claim 1, wherein the one or more processors are further configured to store a metadata file comprising a manifest of a set of files or layers in a container image.

14. The system of claim 13, wherein downloading the archived version associated with the container layer comprises:
querying the metadata file to determine the set of files or layers corresponding to the container layer; and
downloading the set of files or layers corresponding to the container layer.

15. The system of claim 14, wherein a plurality of files or layers of the set of files or layers are downloaded in parallel.

16. The system of claim 1, wherein starting the container based at least in part on the block storage format version comprises:
downloading the block storage format version to a container storage location; and
providing a client system with access to data stored at the container storage location without conversion of compressed file-based archive data for one or more corresponding container layers.

17. The system of claim 1, wherein the block storage format version is stored using a block-based compression.

18. The system of claim 1, wherein the block storage format version comprises a set of blocks having a block size corresponding to a physical storage block size.

19. A method, comprising:
in response to determining to start a container, determining whether a container layer for the container has been previously converted to a block storage format;
in response to determining that the container layer has not been previously converted to a block storage format, downloading a archived version of the container layer;
converting the archived version into a block storage format version of the container layer;
storing the block storage format version of the container layer into a blob storage; and
starting the container; and
in response to determining that the container layer has been previously converted to a block storage format, starting the container based at least in part on the block storage format version.

20. A computer program product embodied in a non-transitory computer readable medium and comprising computer instructions for:
in response to determining to start a container, determining whether a container layer for the container has been previously converted to a block storage format;
in response to determining that the container layer has not been previously converted to a block storage format, downloading a archived version of the container layer;
converting the archived version into a block storage format version of the container layer;
storing the block storage format version of the container layer into a blob storage; and
starting the container; and
in response to determining that the container layer has been previously converted to a block storage format, starting the container based at least in part on the block storage format version.

* * * * *